United States Patent [19]

Bradford et al.

[11] 3,759,221

[45] Sept. 18, 1973

[54] VAPOR COATING USING A CAM CONTROLLED SHUTTER

[75] Inventors: Alan P. Bradford, Alexandria; Lee R. Reed, Woodbridge, both of Va.

[73] Assignee: The United States of America as represented by the Secretary of the Army, Washington, D.C.

[22] Filed: June 14, 1972

[21] Appl. No.: 262,902

[52] U.S. Cl. .............................................. 118/504
[51] Int. Cl. ........................................... C23c 13/08
[58] Field of Search............. 118/7, 8, 301, 48–49.5, 118/504, 505

[56] References Cited
UNITED STATES PATENTS

| 2,160,981 | 6/1939 | O'Brien............................ 118/49 X |
| 2,369,764 | 2/1945 | Ullrich, Jr............................. 118/49 |
| 2,852,416 | 9/1958 | McNavy et al. .................. 118/49 X |
| 3,117,885 | 1/1964 | Pohm et al..................... 118/48 UX |
| 3,395,304 | 7/1968 | Duggan............................ 118/49 X |
| 3,664,295 | 5/1972 | Ng et al. ........................... 118/48 X |

FOREIGN PATENTS OR APPLICATIONS 1,314,569  12/1962  France................................. 118/49

*Primary Examiner*—Morris Kaplan
*Attorney*—Harry M. Saragovitz et al.

[57] ABSTRACT

A device for controlling the coating of a filter substrate for producing a linearly variable material deposit thereon. A heart-shaped cam arrangement derived from an Archimedean spiral provides substantially constant linear reciprocal motion to a shutter which moves over the filter base; thereby exposing the filter base to the deposition of coating material.

3 Claims, 3 Drawing Figures

PATENTED SEP 18 1973

3,759,221

VAPOR COATING USING A CAM CONTROLLED SHUTTER

The invention described herein may be manufactured, used, and licensed by or for the Government for governmental purposes without the payment to us of any royalty thereon.

BACKGROUND

FIELD OF INVENTION

The invention relates to apparatus for producing, for example, a neutral density filter for a filter system which allows continuously varying transmittance over a range of intensities while maintaining uniform optical density over a rather large aperture. Such a filter system consists of two glass substrates with vacuum deposited Ni-Cr alloy; each filter plate having an optical density varying linearly in one direction.

SUMMARY OF THE INVENTION

The filter system being fabricated requires a pair of filter elements each having a substantially wedge-shaped distribution of optically absorbing coating material along each of the filter elements. In order to produce such filter elements a linearly reciprocating shutter in conjunction with the cam control hereinafter described, were developed to control the vapor deposition coating process.

The apparatus of the instant invention employs a cam derived from a portion of the Archimedean spiral and a mirror image thereof resulting in a heart-shaped cam which provides the particular motion to the reciprocating shutter necessary to produce filters having the desired linearly varying optical density.

The particular cam employed and the motion it imparts to a reciprocating shutter will best be explained by the following.

The cam profile is derived from a portion of a plane curve generated by a point moving away from or toward a fixed point at a constant rate while the radius vector from a fixed point rotates at a constant rate. This is expressed mathematically by:

$$R = K \theta$$

where: $R$ = length of radius vector
$K$ = some constant
$\theta$ = the angle swept out by the radius vector.

The practical cam is designed by choosing the minimum radius and then adding to this dimension the desired travel of the shutter which results in the maximum radius. The constant is evaluated by:

$$K = \text{Length of Travel}/180°$$

The radius of the cam at any angle between 0° and 180° is then expressed by:

$$R = \text{Minimum Radius} + K \text{ (angle in degrees)}$$

Transferring these radii to similar angles in the other 180° sector results in a curve which is heart-shaped and symmetrical and which is the locus of the cam follower relative to the axis of rotation. The cam follower is constrained to reciprocate in a straight line directed toward the axis of rotation as the cam follower transmits the straight motion to an opaque shutter mounted immediately adjacent to the filter substrate. When the cam is driven at a constant angular rate, the shutter moves in an approximation of a discontinuous function whereby the shutter moves in one direction at a constant linear velocity and at the limit of its travel instantly reverses and moves in the other direction without appreciable loss of time for deceleration and acceleration. This action occurring during the deposition of evaporated material upon the substrates results in a substantially linear wedge-shaped deposit.

DESCRIPTION OF THE PREFERRED EMBODIMENTS

Figure 1:
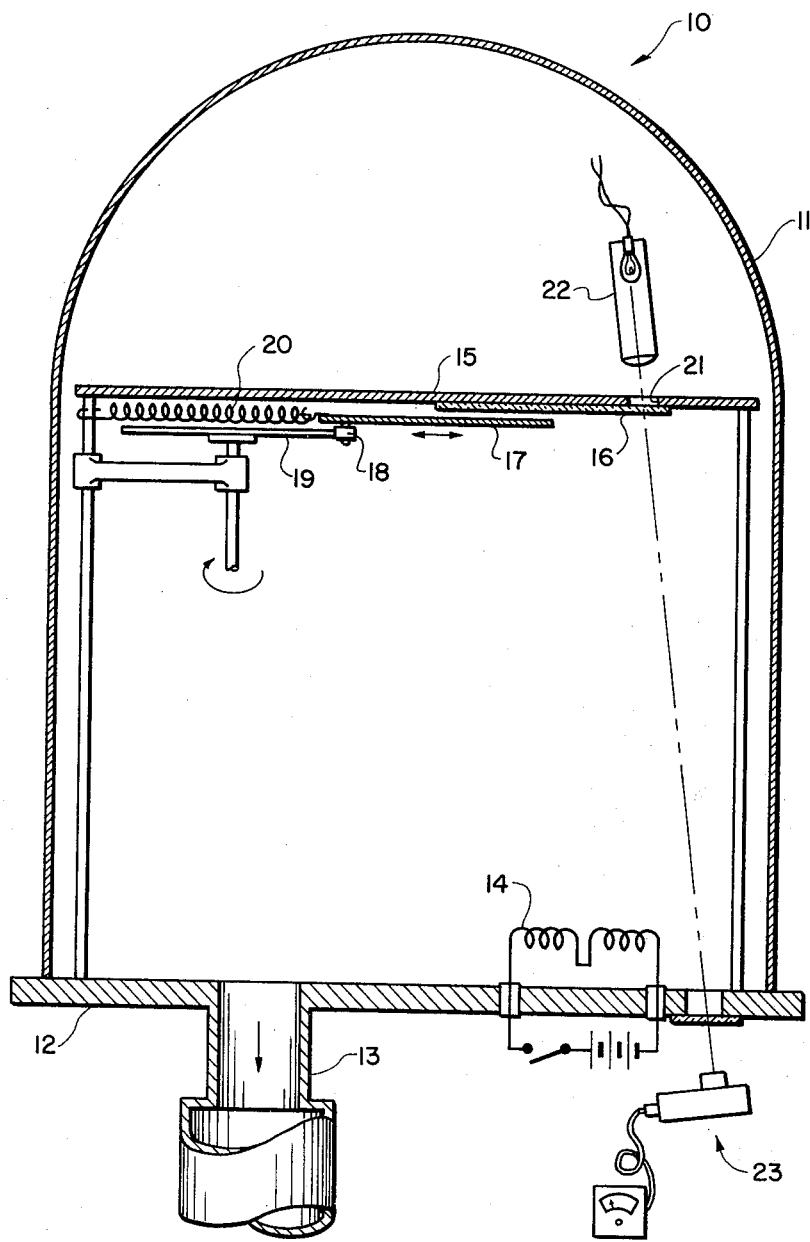
FIG. 1 shows the invention in a typical vacuum chamber environment wherein a filter substrate is coated.

FIG. 1 shows diagrammatically a typical arrangement using the basic elements of the present invention for controlling vapor deposition on a substrate.

A chamber 10 comprises a sealed enclosure 11 over a base 12. A reduced pressure environment is created by reducing the atmosphere in the chamber 10 through exhaust tube 13 by pumping means (not shown). The source of coating material being deposited, for example, Ni-Cr, is vaporized at heating element 14. Of course, any other method of creating the vapor for deposition could be utilized. A base 15 supports the substrates 16 over the vapor source 14 while a shutter reciprocates at substantially constant velocity adjacent the substrate 16 to control the coating. A cam follower 18 attached to the shutter 17 is urged into continuous contact with the heart-shaped cam 19 by spring 20. The base 15 has an aperture through which a source of illumination 22 projects a light beam to a photometer 23. This arrangement permits the coating process to be monitored so that the deposited material produces the desired density on the filter substrate.

The above description of the overall system only places the instant invention in its general environment; for a detailed discussion of the particular invention we turn to the discussion of the following figures.

Figure 2:
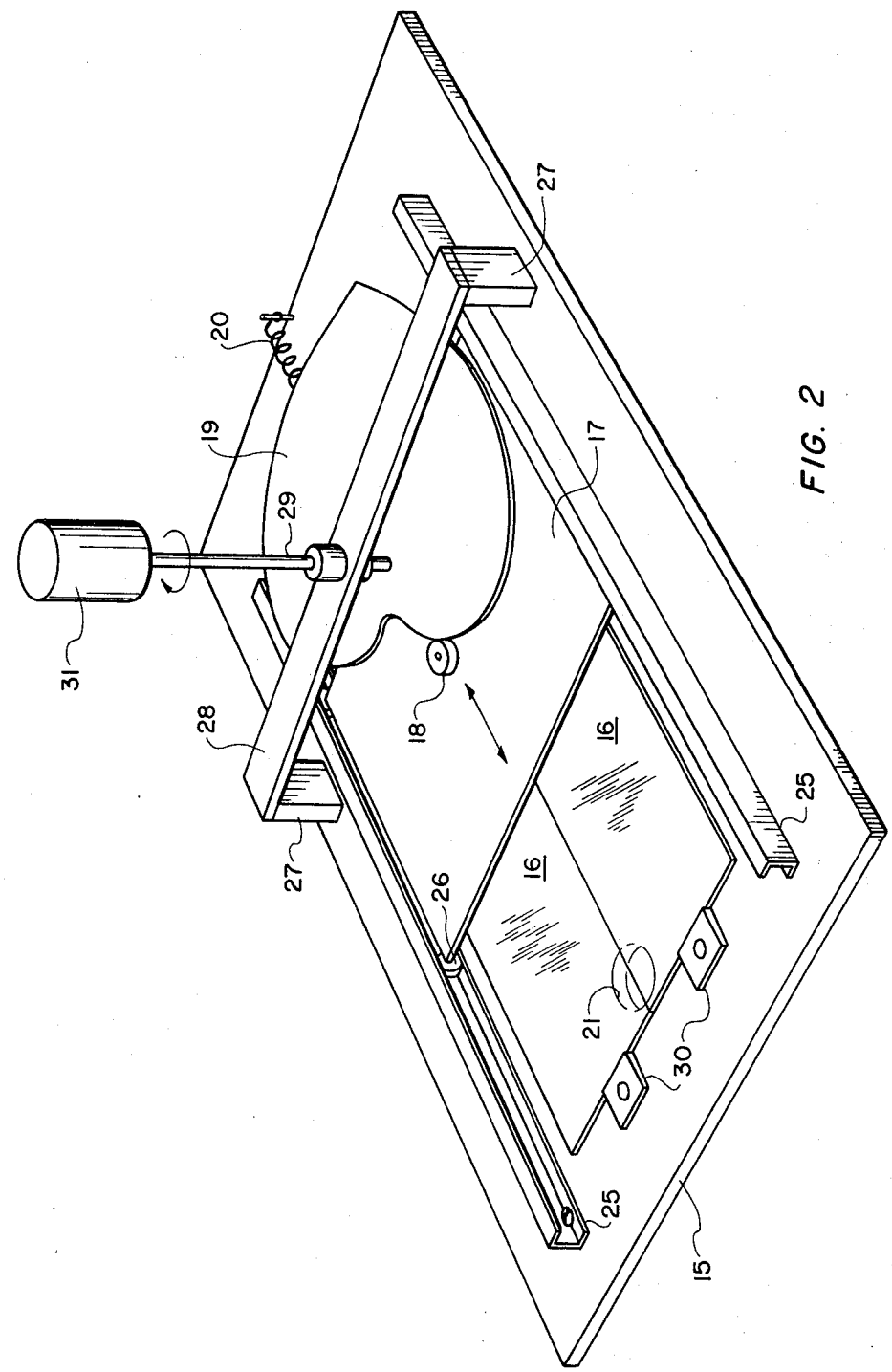
FIG. 2 is an isometric view of one embodiment of the shutter and cam controller arrangement of the instant invention.

The instant invention as seen in one embodiment in FIG. 2, includes a base member 15 having an aperture 21. The aperture provides a light transmission path over which the filter substrate is positioned so that the transmissivity of the filter being prepared may be monitored as the coating process is carried out. A pair of tracks 25 are secured to the base 15. These tracks 25 provide guideways between which a shutter 17, supported on rollers 26 is mounted. A cam follower 18 is mounted atop the shutter. A pair of identical vertical supports 27 adjacent the tracks 25 carry a cross-member 28 which straddles these tracks. An arbor 29 is positioned in an aperture in the cross-member 28. A heart-shaped cam 19 as described above, is affixed to the arbor for rotation therewith. A resilient element, such as a spring 20, is attached between the shutter 17 and the base 15 thereby continuously biasing the cam follower 18, located on the shutter 17, into contact with the cam 19.

To hold at least a pair of filter substrates 16 in a side by side position on the base 15 as shown, retaining members 30 are fixed to the base. The retaining members are necessary to firmly hold the filter substrates in position since the usual method of coating by vapor deposition is to support the plate being coated over the source of vapor material. In the usual manner the device is held in an inverted position over the vapor source during the deposition process.

Motive means 31 are shown diagrammatically providing power to rotate the arbor 29 and the cam 19 affixed thereto.

Figure 3:
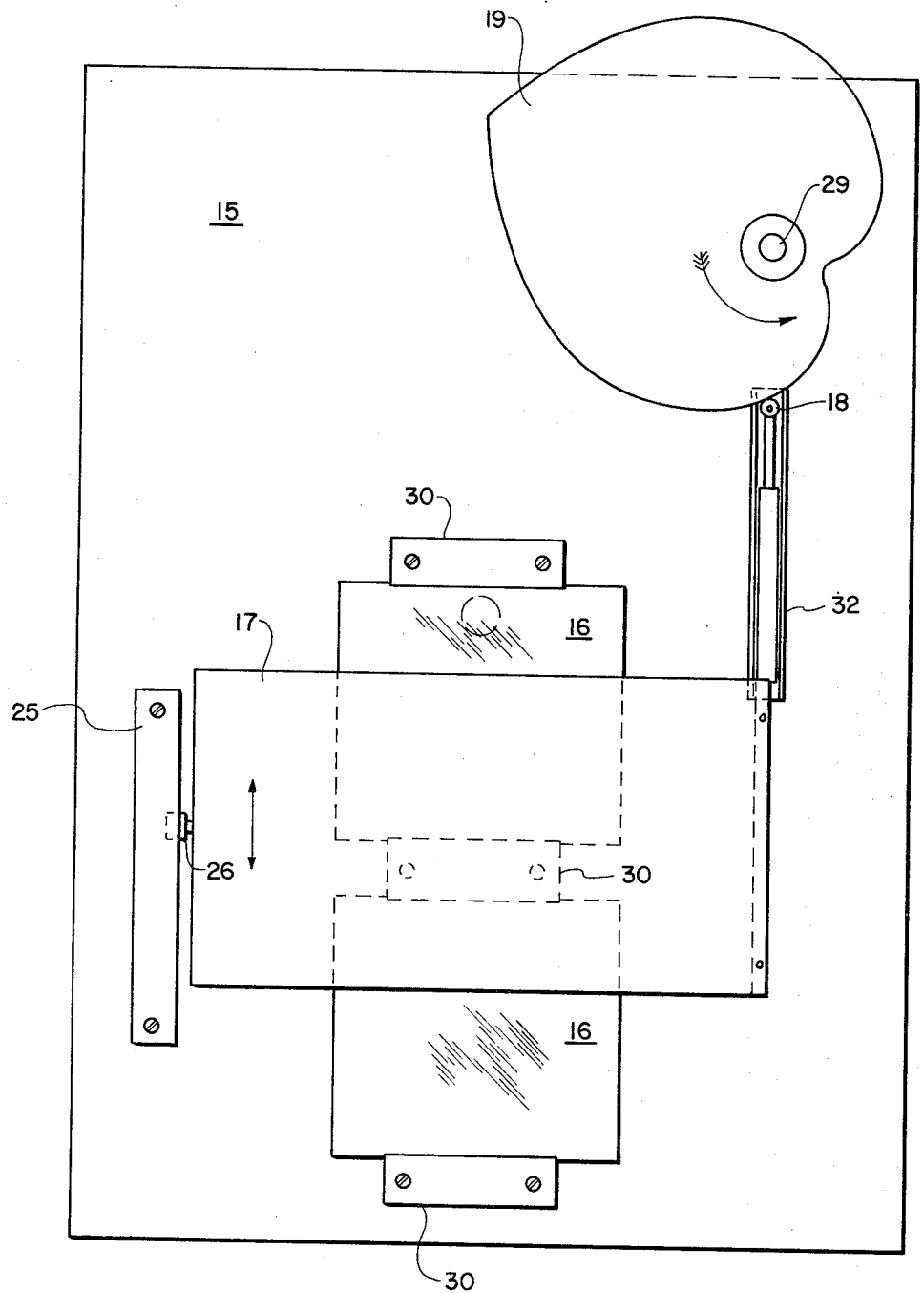
FIG. 3 is a plan view of another embodiment of the shutter and cam controller.

A second embodiment, seen in FIG. 3, allows at least a pair of substrates 16 to be positioned along the axis of reciprocal motion of the shutter 17. This is accomplished by a modification of the device of FIG. 2.

In this embodiment, an arm 32 attached to the shutter 17 supports a cam follower 18 at an end thereof. The cam 19, supported on arbor 29, when driven by motive means (not shown in this figure) causes the shutter 17 to reciprocate at substantially constant speed over each of the substrates 16, respectively, for each half cycle of cam rotation; thereby simultaneously producing at least a pair of linearly varying neutral density filters.

While the particular filter being fabricated are herein described as neutral density filters, it is obvious that the technique is equally applicable to the production of other types of filters, as for example, interference filters.

It is to be understood that various changes, alterations and substitutions may be made while maintaining the spirit and scope of the invention as defined by the following claims.

We claim:

1. Apparatus for controlling the vacuum deposition of a coating material on a filter substrate to produce a deposit having a linearly varying thickness, comprising:

a support having means to retain at least one substrate thereon;

means for supporting shutter means adjacent said support and for constraining said shutter means to linearly reciprocal motion parallel to said substrate;

a cam and cam follower associated with said support and said shutter means for providing linear reciprocal substantially constant velocity motion to said shutter means, said cam being substantially heart-shaped in form and being generated from a portion of an Archimedean spiral and a mirror-image thereof.

2. The apparatus according to claim 1, wherein said cam follower is mounted directly upon said shutter and said heart-shaped cam causes said shutter to increasingly expose the area of said at least one substrate for one-half of said cams rotation and decrease the area of exposure for the subsequent half-cycle.

3. The apparatus according to claim 1, wherein said cam follower is affixed to an arm attached to said shutter; and, means are provided to retain at least a pair of filter substrates in an array parallel to the reciprocal motion of said shutter; whereby, the rotation of said cam through one-half of its cycle causes said shutter to increasingly expose at least one of said substrates as said shutter simultaneously moves to decreasingly expose at least another of said substrates located along the axis of shutter motion.

* * * * *